US012585583B2

(12) United States Patent
Tseng et al.

(10) Patent No.: US 12,585,583 B2
(45) Date of Patent: Mar. 24, 2026

(54) MULTIPLE WRITE PROGRAMMING FOR A SEGMENT OF A MEMORY DEVICE

(71) Applicant: Micron Technology, Inc., Boise, ID (US)

(72) Inventors: Huai-Yuan Tseng, San Ramon, CA (US); Xiangyu Tang, San Jose, CA (US); Eric N. Lee, San Jose, CA (US); Haibo Li, Cupertino, CA (US); Kishore Kumar Muchherla, San Jose, CA (US); Akira Goda, Tokyo (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/781,838

(22) Filed: Jul. 23, 2024

(65) Prior Publication Data

US 2025/0077416 A1      Mar. 6, 2025

Related U.S. Application Data

(60) Provisional application No. 63/536,911, filed on Sep. 6, 2023.

(51) Int. Cl.
*G06F 12/02* (2006.01)
(52) U.S. Cl.
CPC ............................... *G06F 12/0246* (2013.01)
(58) Field of Classification Search
None
See application file for complete search history.

(56) References Cited

U.S. PATENT DOCUMENTS

| | | | | |
|---|---|---|---|---|
| 5,815,434 | A * | 9/1998 | Hasbun ................ | G11C 11/5642 |
| | | | | 365/185.33 |
| 8,131,915 | B1 * | 3/2012 | Yang .................... | G06F 12/0246 |
| | | | | 711/163 |
| 8,533,386 | B1 * | 9/2013 | Yang .................... | G06F 12/0246 |
| | | | | 711/173 |
| 9,972,396 | B1 * | 5/2018 | Naik .................... | G11C 11/5635 |
| 2002/0149963 | A1 * | 10/2002 | De Sandre .......... | G11C 11/5628 |
| | | | | 365/185.03 |
| 2011/0138104 | A1 * | 6/2011 | Franceschini ....... | G06F 12/0246 |
| | | | | 711/E12.001 |
| 2021/0278990 | A1 * | 9/2021 | Choi ...................... | G06F 3/0652 |
| 2023/0402071 | A1 * | 12/2023 | Park .................... | G11C 11/5671 |

FOREIGN PATENT DOCUMENTS

| | | | | | |
|---|---|---|---|---|---|
| KR | 20100046757 A | * | 5/2010 | ............. | G11C 16/26 |
| WO | WO-2013151846 A1 | * | 10/2013 | ......... | G11C 11/5628 |

* cited by examiner

*Primary Examiner* — Kevin Verbrugge
(74) *Attorney, Agent, or Firm* — Lowenstein Sandler LLP

(57) ABSTRACT

A memory device can include a memory array including memory cells arranged in one or more pages. The memory array can be coupled to control logic to receive a first request to write first data to a page of the one or more pages and program the first data to the page of the one or more pages at a first time responsive to receiving the first request. The control logic is further to receive a second request to write second data to the page of the one or more pages, read the page of the one or more pages, and program the second data to the page of the one or more pages at a second time responsive to receiving the second request. The control logic can also receive an erase request to erase the one or more pages after the second time.

20 Claims, 10 Drawing Sheets

| Host Data 705 | Write 710-a | Write 710-b |
|---|---|---|
| 710 ⌐00⌐730 | 111 ⌐735 | →000 |
| 01←720 | 011 715 | ↗100 |
| →10 | 101 | ↖010 |
| 11 | 110 ⌐725 | 001 |

Figure 4:
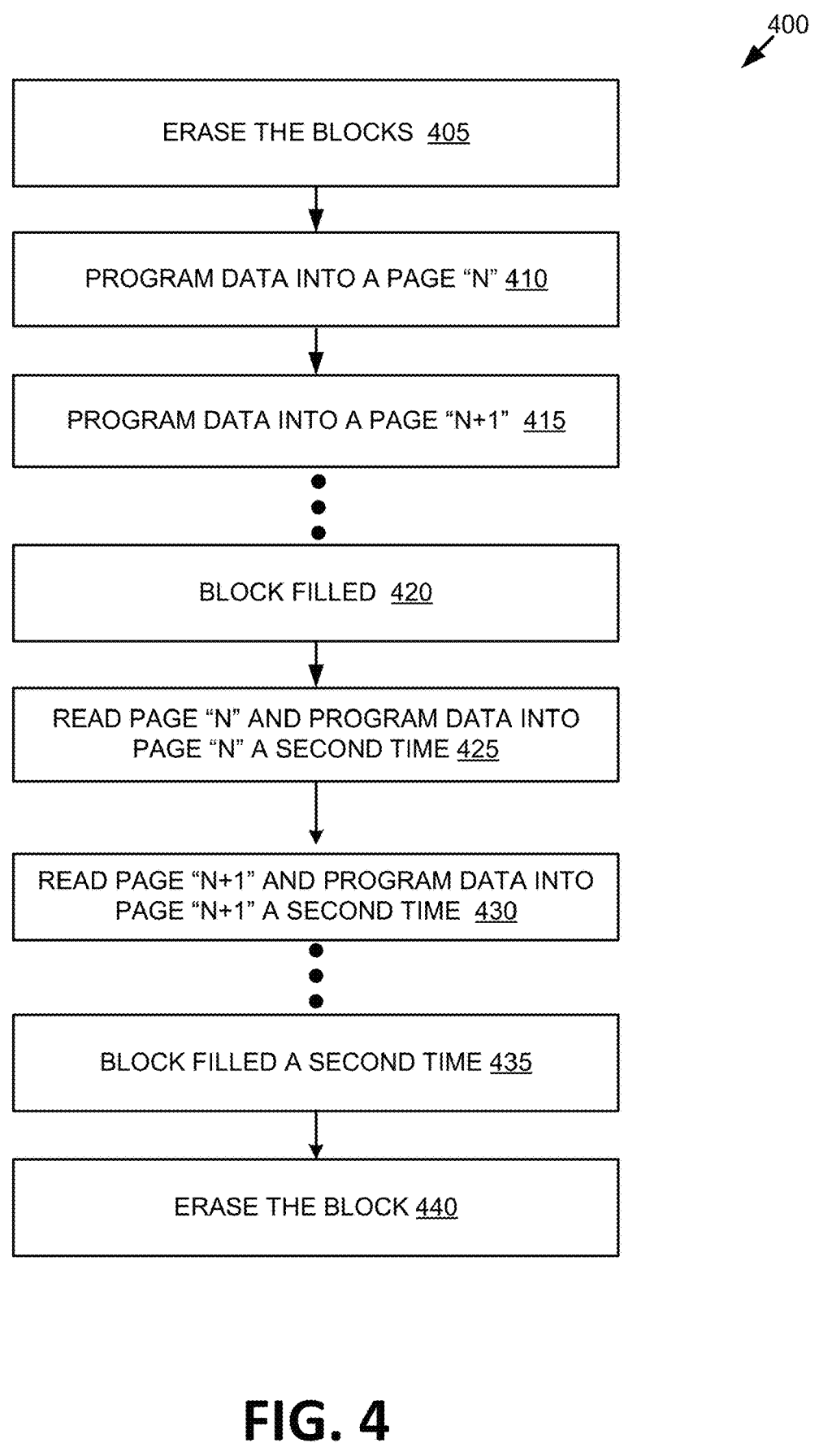

400

ERASE THE BLOCKS 405

PROGRAM DATA INTO A PAGE "N" 410

PROGRAM DATA INTO A PAGE "N+1" 415

BLOCK FILLED 420

READ PAGE "N" AND PROGRAM DATA INTO PAGE "N" A SECOND TIME 425

READ PAGE "N+1" AND PROGRAM DATA INTO PAGE "N+1" A SECOND TIME 430

BLOCK FILLED A SECOND TIME 435

ERASE THE BLOCK 440

ERASE THE BLOCKS <u>505</u>

PROGRAM DATA INTO A PAGE "N" <u>510</u>

READ PAGE "N" AND PROGRAM DATA INTO A PAGE "N" A SECOND TIME <u>515</u>

PROGRAM DATA INTO A PAGE "N+1" <u>520</u>

READ PAGE "N+1" AND PROGRAM DATA INTO PAGE "N+1" A SECOND TIME <u>525</u>

BLOCK FILLED <u>530</u>

ERASE THE BLOCK <u>540</u>

600

ERASE THE BLOCKS 605

PROGRAM DATA INTO A PAGE "N" 610

PROGRAM DATA INTO A PAGE "N+1" 615

BLOCK FILLED 620

READ PAGE "N+5" AND PROGRAM DATA INTO PAGE "N+5" A SECOND TIME 625

READ PAGE "N+4" AND PROGRAM DATA INTO PAGE "N+4" A SECOND TIME 630

READ PAGE "N+5" AND PROGRAM DATA INTO PAGE "N+5" A THIRD TIME 635

READ AND PROGRAM DATA INTO PAGES "N+6" THROUGH "N+9" A SECOND TIME 640

ERASE THE BLOCK 645

| Host Data 705 | Write 710-a | Write 710-b |
|---|---|---|
| 710 ⌐00 ⌐730 | 111 ⌐735 → | 000 |
| 01 ←720 | 011 715 | 100 |
| →10 | 101 | 010 |
| 11 | 110 ⌐725 | 001 |

800

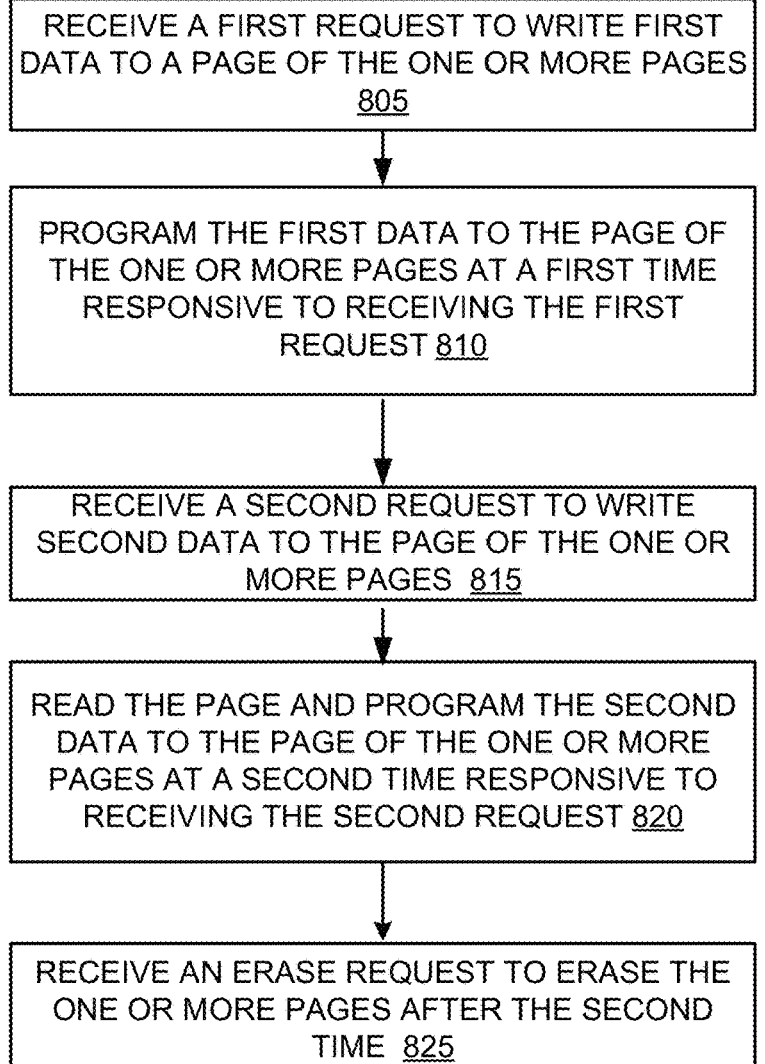

RECEIVE A FIRST REQUEST TO WRITE FIRST DATA TO A PAGE OF THE ONE OR MORE PAGES
805

PROGRAM THE FIRST DATA TO THE PAGE OF THE ONE OR MORE PAGES AT A FIRST TIME RESPONSIVE TO RECEIVING THE FIRST REQUEST 810

RECEIVE A SECOND REQUEST TO WRITE SECOND DATA TO THE PAGE OF THE ONE OR MORE PAGES  815

READ THE PAGE AND PROGRAM THE SECOND DATA TO THE PAGE OF THE ONE OR MORE PAGES AT A SECOND TIME RESPONSIVE TO RECEIVING THE SECOND REQUEST 820

RECEIVE AN ERASE REQUEST TO ERASE THE ONE OR MORE PAGES AFTER THE SECOND TIME  825

FIG. 8

MULTIPLE WRITE PROGRAMMING FOR A SEGMENT OF A MEMORY DEVICE

RELATED APPLICATIONS

This application claims the benefit of priority from U.S. Provisional Application No. 63/536,911 filed Sep. 6, 2023, the entire contents of which are hereby incorporated by reference herein.

TECHNICAL FIELD

Embodiments of the disclosure relate generally to memory sub-systems, and more specifically, relate to a multiple write programming for a segment of a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of an example method for multiple write programming, in accordance with some embodiments of the present disclosure.

FIG. 8 is a flow diagram of an example method for multiple write programming, in accordance with some embodiments of the present disclosure.

DETAILED DESCRIPTION

Figure 1A:
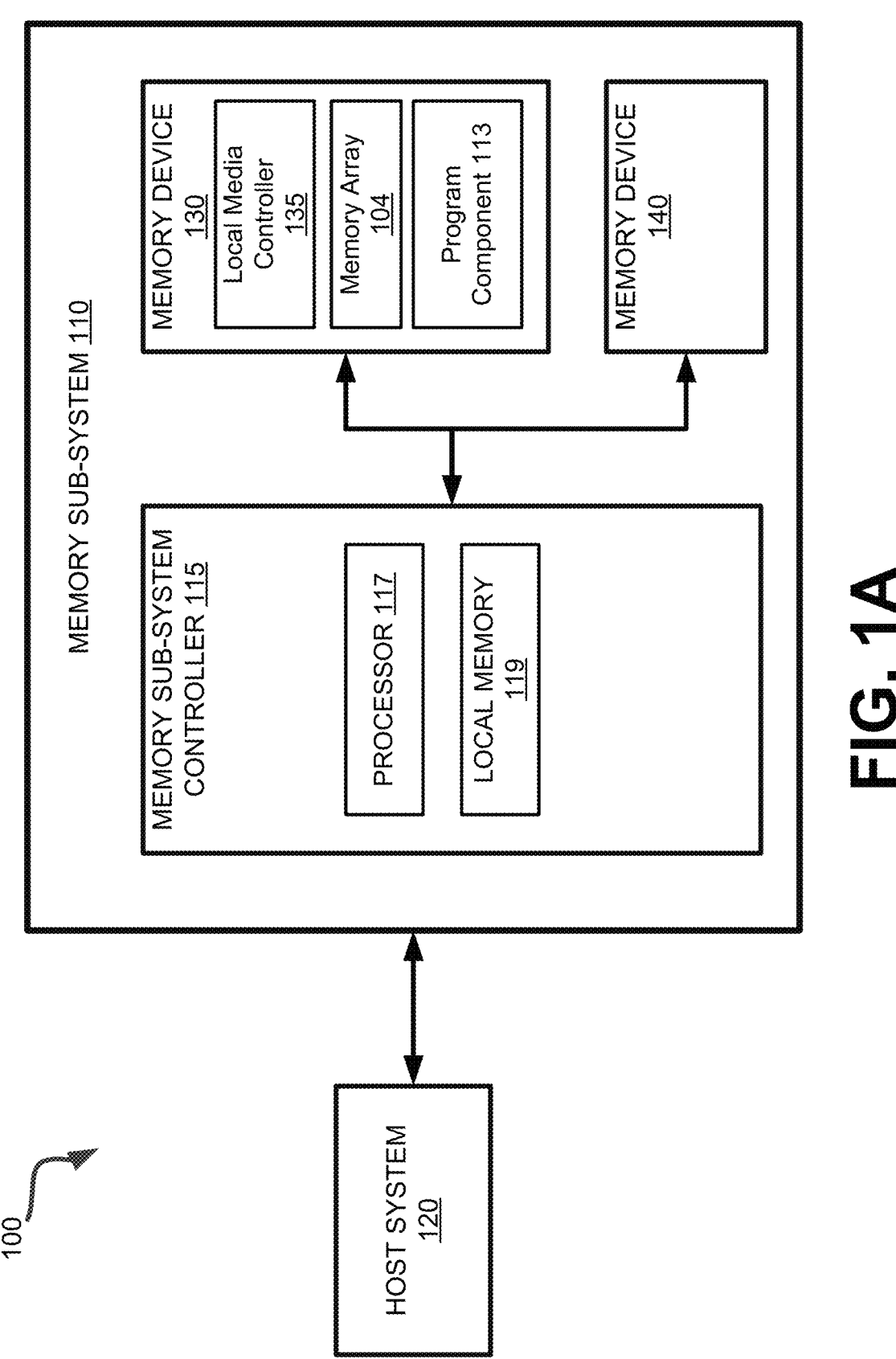
FIG. 1A illustrates an example computing system that includes a memory sub-system in accordance with some embodiments of the present disclosure.

Aspects of the present disclosure are directed to multiple write programming for a segment of a memory device. For example, a memory sub-system can write to a page multiple times before an erase operation is performed. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bit lines) and rows (also hereinafter referred to as wordlines). A wordline can refer to one or more rows of memory cells of a memory device that are used with one or more bit lines to generate the address of each of the memory cells. The intersection of a bit line and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. Each data block can include a number of sub-blocks, where each sub-block is defined by an associated pillar (e.g., a vertical conductive trace) extending from a shared bit line. Memory pages (also referred to herein as "pages") store one or more bits of binary data corresponding to data received from the host system. To achieve high density, a string of memory cells in a non-volatile memory device can be constructed to include a number of memory cells at least partially surrounding a pillar of channel material. The memory cells can be coupled to access lines, which are commonly referred to as "wordlines," often fabricated in common with the memory cells, so as to form an array of strings in a block of memory. The compact nature of certain non-volatile memory devices, such as 3D flash NAND memory, means wordlines are common to many memory cells within a block of memory.

During a program operation or an erase operation on a non-volatile memory device, a selected memory cell(s) can be programmed or erased with the application of a voltage to a selected wordline. In some solutions, a page or block of the memory device can be written to once during a write or program operation before page is erased—e.g., after a page in the memory device is written to, it cannot be written to again. That is, in some solutions trying to write to a previously written page can cause disturb to existing data stored in the block. In such solutions, data cannot be updated in place—e.g., the data cannot be updated within the same page by rewriting the page. Instead, these solutions either erase the page and rewrite the entire page or it is done in a different block and garbage collection is used—e.g., the updated data is written to a new block, the previous block undergoes garbage collection, and future incoming requests to access the data are directed to the new block. However, a memory cell may undergo a limited number of write and erase cycles due to degradation—e.g., a memory cell may be written to a predetermined number of times before the memory cell becomes unreliable. For example, in some solutions, if a memory cell is written to 100,000 times, the memory cell is also erased 100,00 times. Accordingly, a memory cell undergoes unnecessary write and erase cycles in order to update currently written data.

Aspects of the present disclosure address the above and other deficiencies by enabling multiple write programming for a segment, such as a block, before the segment erased. For example, a page can be rewritten two or more times before an erase operation is performed. In some examples, the memory sub-system can write different data on a same page at least two times before an erase operation is performed. For example, after having previously written data to a given page, the memory sub-system can subsequently read the previously written data, and then write new data to the page, based on the current data read from the page. In some cases, the memory sub-system can write data in all pages of a block and then proceed to write different data in all of the pages until the block is full of updated data. In other cases, the memory sub-system can write data to random pages in a random order. For example, the memory sub-system can write data to a first page, write data to a second page, write data to the first page again, write to a third page, write data to the first page a third time, etc. The memory sub-system can utilize a code (e.g., a write-once-memory (WOM) code) to write a page multiple times as described with reference to FIG. 7—e.g., the WOM code can ensure a memory cell is written with increasing logic states. In at least one example, the memory cells written to can be single level cells (SLC), multi-level cells (MLC), triple level cells (TLC), quadruple level cells (QLC), etc.

By performing multiple writes to a block before a memory cell is erased, data can be updated in place—e.g., the data can be updated within the page without an erase operation or performing a garbage collection operation. Additionally, a total number of erase cycles is reduced, as the previously programmed data is only read before being programmed again, rather than being erased. For example, because a memory cell is written to (i.e., programmed) two or more times, a number of erase operations is reduced by at least one half—e.g., rather than performing a write and then an erase, the memory sub-system can perform at least two writes before performing the erase operation. Utilizing the code while performing the write operation can further increase terabytes written (TWB)—e.g., the total amount of terabytes data that can be written to a memory cell is increased by reducing a number of program and erase cycles.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device. Memory device 130, for example, can represent a single die having some control logic (e.g., local media controller 135) embodied thereon. In some embodiments, one or more components of memory sub-system 110 can be omitted.

In at least one embodiment, the memory device 130 can include a program component 113. In at least one embodiment, the program component 113 can program one or more pages of the memory device 130 two or more times. For example, the program component 113 can receive an initial request to program a page to store first data. The program component 113 can program the first data to the page. In some embodiments, the program component 113 can then receive a second request to write second data to the page— e.g., update the page with the second data. In such embodiments, the program component 113 can read the previously written data and write to the same page a second time to program the page to the second data. In at least one embodiment, the program component 113 can update the page without decreasing a logical state of any memory cell within the page (e.g., without erasing any data). Additional details regarding writing a page one or more times is described with reference to FIGS. 3-8.

In some embodiments, the memory sub-system controller 115 includes at least a portion of program component 113. In other embodiment, local media controller 135 includes at least a portion of program component 113 and is configured to perform the functionality described herein. In such an embodiment, program component 113 can be implemented using hardware or as firmware, stored on memory device 130, executed by the control logic (e.g., voltage calibration component 113) to perform the operations related to a program operation described herein.

Figure 1B:
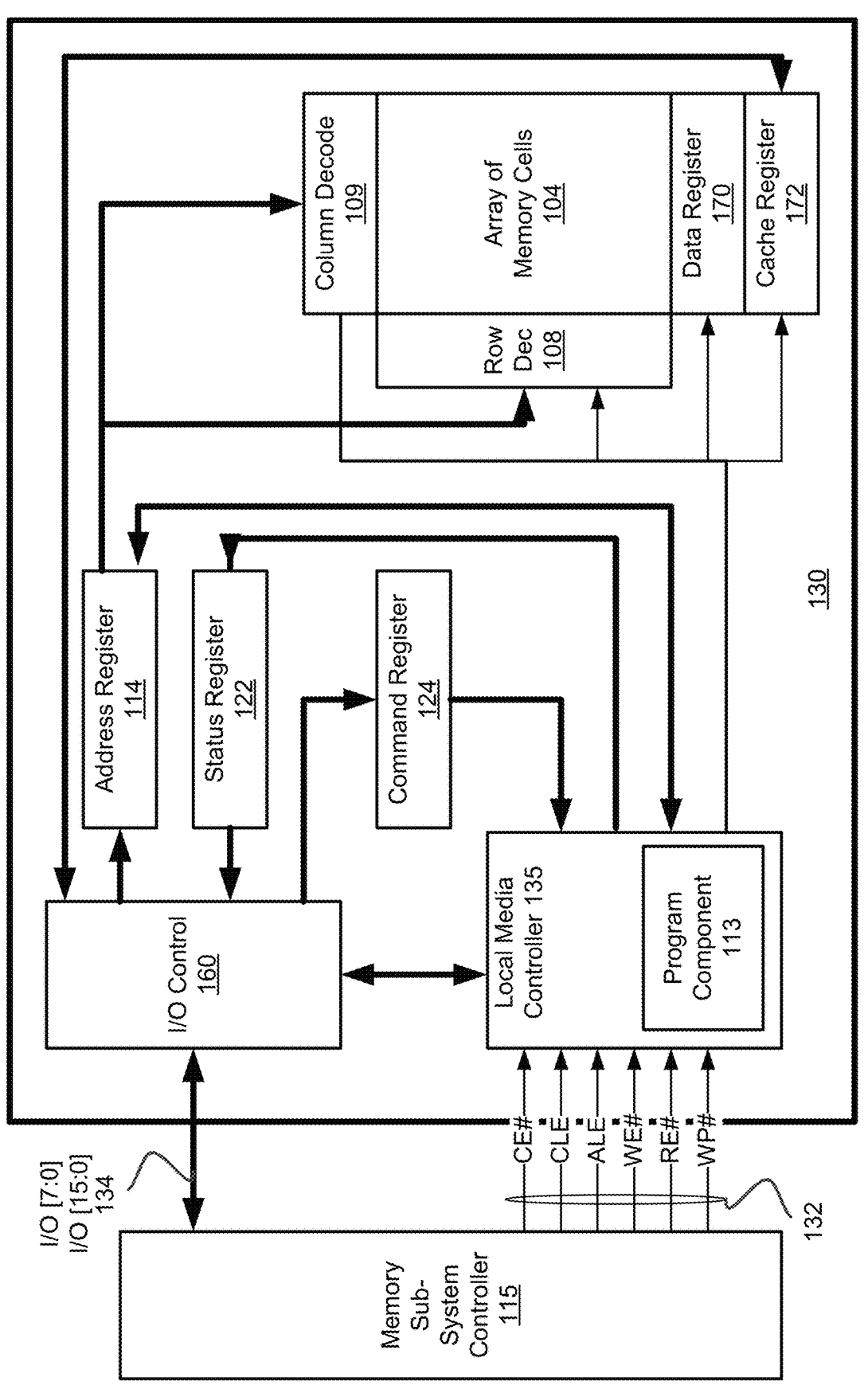
FIG. 1B is a block diagram of a memory device in communication with a memory sub-system controller of a memory sub-system, in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. The local media controller 135 can include the program component 113.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
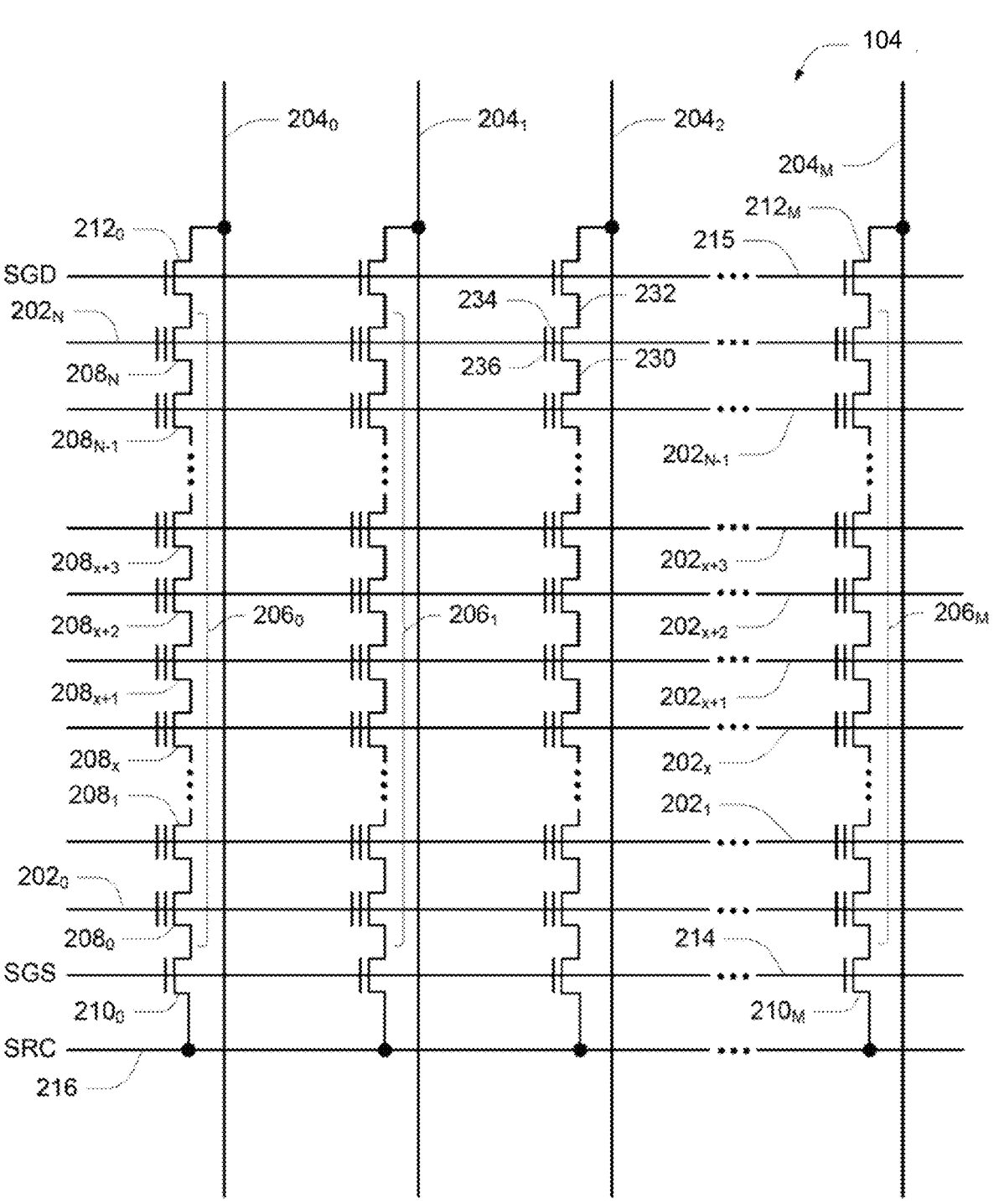
FIG. 2 is a schematic of portions of an array of memory cells as could be used in a memory of the type described with reference to FIG. 1B in accordance with some embodiments of the present disclosure.

FIG. 2 is a schematic of portions of an array of memory cells 104, such as a NAND memory array, as could be used in a memory of the type described with reference to FIG. 1B according to an embodiment. Memory array 104 includes access lines, such as wordlines $202_0$ to $202_N$, and data lines, such as bit lines $204_0$ to $204_M$. The wordlines 202 can be connected to global access lines (e.g., global wordlines), not shown in FIG. 2, in a many-to-one relationship. For some embodiments, memory array 104 can be formed over a semiconductor that, for example, can be conductively doped to have a conductivity type, such as a p-type conductivity, e.g., to form a p-well, or an n-type conductivity, e.g., to form an n-well.

Memory array 104 can be arranged in rows (each corresponding to a wordline 202) and columns (each corresponding to a bit line 204). Each column can include a string of series-connected memory cells (e.g., non-volatile memory cells or replacement gate (RG) NAND memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bit line 204 for the corresponding NAND string 206. For example, the drain of select gate $212_0$ can be connected to the bit line $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bit line 204. A control gate of each select gate 212 can be connected to select line 215.

In one embodiment, one or more of NAND strings 206 can be designated as sacrificial strings and used to detect read disturb in memory array 104. For example, NAND string $206_0$ can be designated a sacrificial string. In other embodiments, there can be different NAND strings or additional NAND strings, including two or more NAND strings, which are designated as sacrificial strings. In one embodiment, NAND string $206_0$ can include at least one sacrificial memory cell 208 from each wordline 202. These sacrificial memory cells 208 in the sacrificial memory string $206_0$ are not made available to the memory sub-system controller, and thus are not used to store host data. Rather, the sacrificial memory cells 208 remain in a default state (e.g., an erased state) or are programmed to a known voltage (e.g., a voltage corresponding to a known state). When a read operation is performed on any of the wordlines in memory array 104, a read voltage is applied to the selected wordline and a pass voltage is applied to the unselected wordlines, and the sacrificial memory cells will experience the same read disturb effects as the memory cells storing host data. When the read disturb effects become strong enough, one or more of the sacrificial memory cells can shift from the default or known state to a different state (e.g., to a state associated with a higher voltage level). Thus, local media controller 135 can perform a string sensing operation on the string of sacrificial memory cells to determine whether read disturb has occurred. In one embodiment, to perform the string sensing operation a predefined read voltage is applied to each wordline 202 concurrently, and the current through the sacrificial string $206_0$ is sensed. If any of the sacrificial memory cells 208 in the sacrificial string $206_0$ has shifted to a different state, the sacrificial string $206_0$ will not conduct and current will not flow. Thus, in such a situation, local media controller 135 can determine that read disturb is present in the block of memory array 104.

The memory array 104 in FIG. 2 can be a quasi-two-dimensional memory array and can have a generally planar structure, e.g., where the common source 216, NAND strings 206 and bit lines 204 extend in substantially parallel planes. Alternatively, the memory array 104 in FIG. 2 can be a three-dimensional memory array, e.g., where NAND strings 206 can extend substantially perpendicular to a plane containing the common source 216 and to a plane containing the bit lines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 have their control gates 236 connected to (and in some cases form) a wordline 202.

A column of the memory cells 208 can be a NAND string 206 or a number of NAND strings 206 selectively connected to a given bit line 204. A row of the memory cells 208 can be memory cells 208 commonly connected to a given wordline 202. A row of memory cells 208 can, but need not, include all the memory cells 208 commonly connected to a given wordline 202. Rows of the memory cells 208 can often be divided into one or more groups of physical pages of memory cells 208, and physical pages of the memory cells 208 often include every other memory cell 208 commonly connected to a given wordline 202. For example, the memory cells 208 commonly connected to wordline $202_N$ and selectively connected to even bit lines 204 (e.g., bit lines $204_0$, $204_2$, $204_4$, etc.) can be one physical page of the memory cells 208 (e.g., even memory cells) while memory cells 208 commonly connected to wordline $202_N$ and selectively connected to odd bit lines 204 (e.g., bit lines $204_1$, $204_3$, $204_5$, etc.) can be another physical page of the memory cells 208 (e.g., odd memory cells).

Although bit lines $204_3$-$204_5$ are not explicitly depicted in FIG. 2, it is apparent from the figure that the bit lines 204 of the array of memory cells 104 can be numbered consecutively from bit line $204_0$ to bit line $204_M$. Other groupings of the memory cells 208 commonly connected to a given wordline 202 can also define a physical page of memory cells 208. For certain memory devices, all memory cells commonly connected to a given wordline can be deemed a physical page of memory cells. The portion of a physical page of memory cells (which, in some embodiments, could still be the entire row) that is read during a single read operation or programmed during a single programming operation (e.g., an upper or lower page of memory cells) can be deemed a logical page of memory cells. A block of memory cells can include those memory cells that are configured to be erased together, such as all memory cells connected to wordlines $202_0$-$202_N$ (e.g., all NAND strings 206 sharing common wordlines 202). Unless expressly distinguished, a reference to a page of memory cells herein refers to the memory cells of a logical page of memory cells. Although the example of FIG. 2 is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 3:
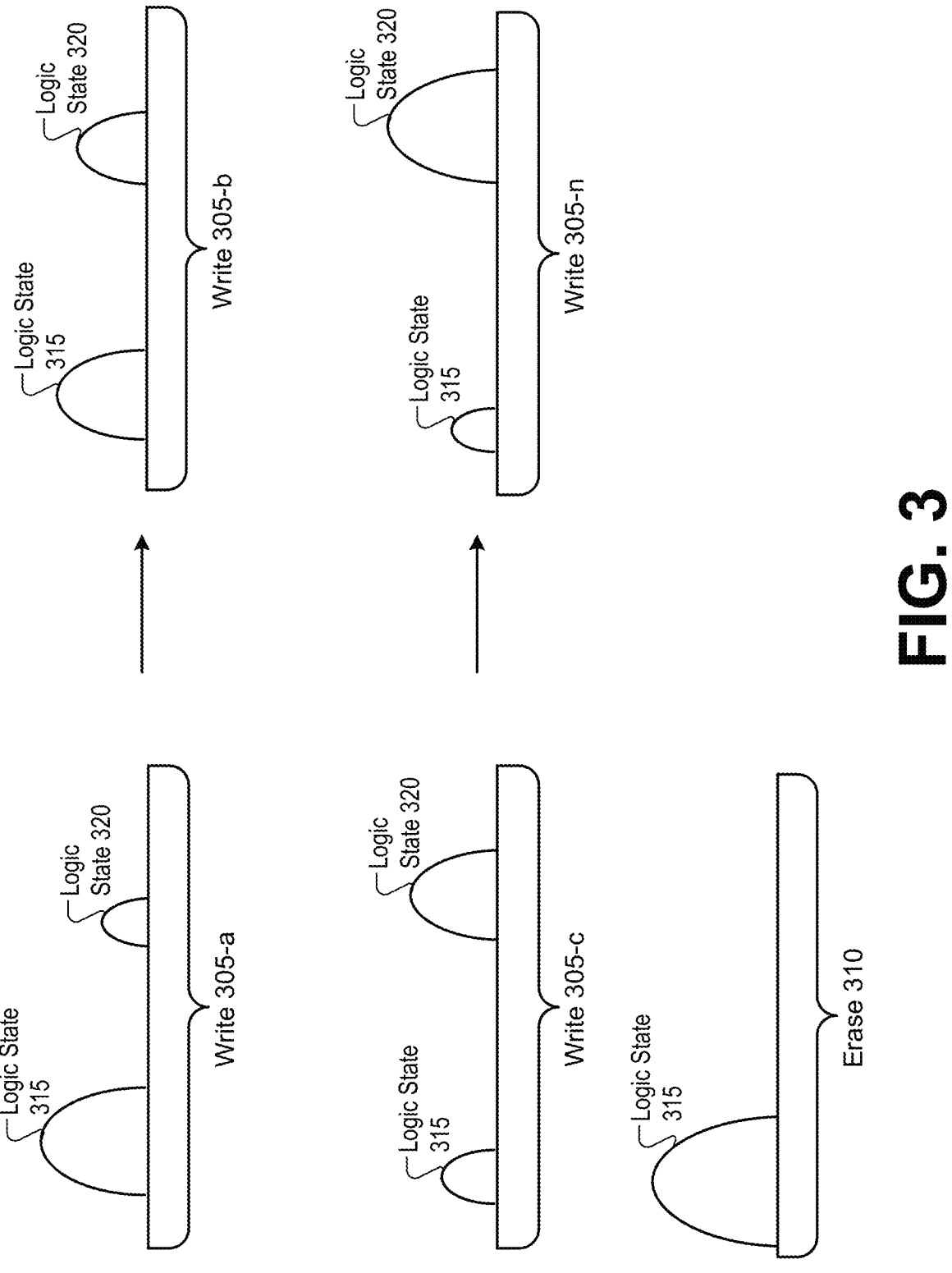
FIG. 3 is a diagram illustrating multiple write programming, in accordance with some embodiments of the present disclosure.

FIG. 3 is a diagram illustrating multiple write programming for a block, according to at least one embodiment. FIG. 3 illustrates a write 305-a, a write 305-b, a write 305-c, a write 305-n, and an erase operation 310. In at least one embodiment, FIG. 3 illustrates a write and erase operation on a single level cell (SLC), but the methods described herein can be utilized for triple level cells (TLC), quadruple level cells (QLC), multi-level cells (MLC), etc. In at least one embodiment, a logic state 315 (e.g., a '0') can be a default erased state and a logic state 320 (e.g., a '1') can be a written state—e.g., a memory cell can be erased to a logic state 315 and written to a logic state 320. In one embodiment, FIG. 3 illustrates memory cells in a single page or a single block.

Before write 305-a, memory cells in a page or a block can be erased to a logic state 315 as illustrated with reference to erase 310. During write 305-a, a local media controller (e.g., local media controller 135 or the program component 113 as described with reference to FIG. 1) can program (e.g., write) a subset of memory cells in the page or block to a logic state 320. Accordingly, after the write 305-a, some memory cells can remain at a logic state 315 while others are programmed to the logic state 320.

After write 305-a, the local media controller can perform a second write on the same page or block during write 305-b. For example, the local media controller can program (e.g., write) a second subset of memory cells in the page or block to the logic state 320. In such examples, during the second write, additional memory cells can be programmed to the logic state 320.

After write 305-b, the local media controller can perform a third write on the same page or block during write 305-c. For example, the local media controller can program (e.g., write) a third subset of memory cells in the page or block to the logic state 320. In such examples, during the third write, additional memory cells can be programmed to the logic state 320—e.g., after the write 305-c, there can be more memory cells programmed to the logic state 320 than to the logic state 315.

After write 305-c, the local media controller can continue to write to the same block or page until an $n^{th}$ write (e.g., write 305-n). As described with reference to FIG. 3, the local media controller during each write can write memory cells to an increasing logic state (e.g., from logic state 315 to logic state 320). In one embodiment, the increasing logic state includes a logic state associated with a higher voltage level. Depending on the implementation, this can include changing a logic state '0' to a logic state '1' or changing a logic state '1' to a logic state '0'. For example, if the lower voltage level is defined as logic state '0', then writing the memory cells to an increasing logic state includes changing from logic state '0' to logic state '1'. Conversely, if the lower voltage level is defined as a logic state '1', then writing the memory cells to an increasing logic state includes changing from logic state '1' to logic state '0'. The local media controller can refrain from writing memory cells to a decreasing logic state (e.g., the local media controller can refrain from programming a memory cell from logic state 320 to logic state 315) by utilizing the code discussed in FIG. 7. In one embodiment, the decreasing logic state includes a logic state associated with a lower voltage level. It should be noted, that the $n^{th}$ write can be any number of writes (e.g., two, three, four, five, six, seven, etc.). By utilizing the method described herein, the local media controller is able to write at least two times to the same page or block without having to erase the entire page or block or utilize garbage collection.

In some examples, after the $n^{th}$ write, the local media controller can receive an erase command. In such examples, the local media controller can perform an erase 310. During the erase 310, the local media controller can erase all the memory cells and reset them back to the logic state 315.

FIG. 4 is a flow diagram of an example method of multiple write programming for a block, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by a local media controller 135 or program component 113 as described with reference to FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel.

Additionally, one or more processes can be omitted in various embodiments. Thus, not all processes are required in every embodiment. Other process flows are possible.

At operation 405, blocks are erased. For example, the processing logic (e.g., the local media controller 135 or the program component 113) can erase all blocks in a memory device (e.g., memory device 130 as described with reference to FIG. 2). In some embodiments, the processing logic proceeds to erase all pages in a respective block during the erase operation.

At operation 410, a page "N" is programmed. For example, the processing logic can program data into a page "N"—e.g., program data into a first page of the block.

At operation 415, a page "N+1" is programmed. For example, the processing logic can program data into a page "N+1."—e.g., program data into a second page of the block. In some examples, the "N+1" page can be adjacent to page "N"—e.g., the processing logic can program the block in a sequential order. In some embodiments, the processing logic can continue to program the pages sequentially—e.g., proceed to program page "N+2," then program page "N+3," program page "N+4," etc.

At operation 420, a block is filled. For example, the processing logic can write data to each page of the block by a certain time. In some embodiments, after writing data to the block, the processing logic can receive a command to write data a second time to one or more pages. For example, a host system (e.g., host system 120 as described with reference to FIG. 1) can request to update data at a particular block or page. In such examples, the processing logic can receive the request and then proceed with writing the updated data to the same block—e.g., as described herein, each page or block can be written to at least two times if data stored at the respective page or block is updated.

At operation 425, the page "N" is read and programmed for a second time. For example, the processing logic can read the data previously programmed to page "N" and program data into a page "N" a second time e.g., program data into the first page of the block a second time. In one embodiment, as described with reference to FIGS. 3 and 7, the processing logic can write to a page a second time to increase a logic state of one or memory cells to reflect the updated data—e.g., the processing logic can refrain from programming a memory cells to a decreasing logic state. For example, the processing logic can write a page a second time to program a memory cell from a logic state '1' to a logic state '0' but not vice versa if the logic state '1' is the erased state (i.e., lower voltage). If, however, the logic state '0' is the erased state (i.e., lower voltage), the processing logic can write a page to a second time to program a memory cell from a logic state '0' to a logic state '1' but not vice versa. That is, the processing logic can program one or more cells of the page to a logic state associated with higher voltage, which may represent either a logic state '1' or a logic state '0' depending on the implementation.

At operation 430, the page "N+1" is read and programmed a second time. For example, the processing logic can read the data previously programmed to page "N+1" and program data into a page "N+1" a second time—e.g., program data into a second page of the block a second time. In some embodiments, the processing logic can continue to program the pages sequentially for the second time—e.g., proceed to program page "N+2" a second time, then program page "N+3" a second time, program page "N+4" a second time, etc.

At operation 435, the block is filled a second time. For example, the processing logic can write data to each page of the block a second time by a time 430. In some embodiments, after writing data to the block a second time, the processing logic can receive a command to write data a third time to one or more pages. For example, the host system can request to update data at a particular block or page a third time. In such examples, the processing logic can receive the request and then proceed with writing the updated data to the same block a third time. In at least one embodiment, the processing logic can proceed to write data to the pages an "X" number of times, where "X" is any number greater than two. That is, the processing logic can program data into all of the pages repeatedly until an erased command is received. If an erase command is receive, the processing logic can proceed to operation 440.

At operation 440, the block is erased. For example, the processing logic can erase one or more blocks in a memory device. In some embodiments, the processing logic proceeds to erase all pages in a respective block during the erase operation.

Figure 5:
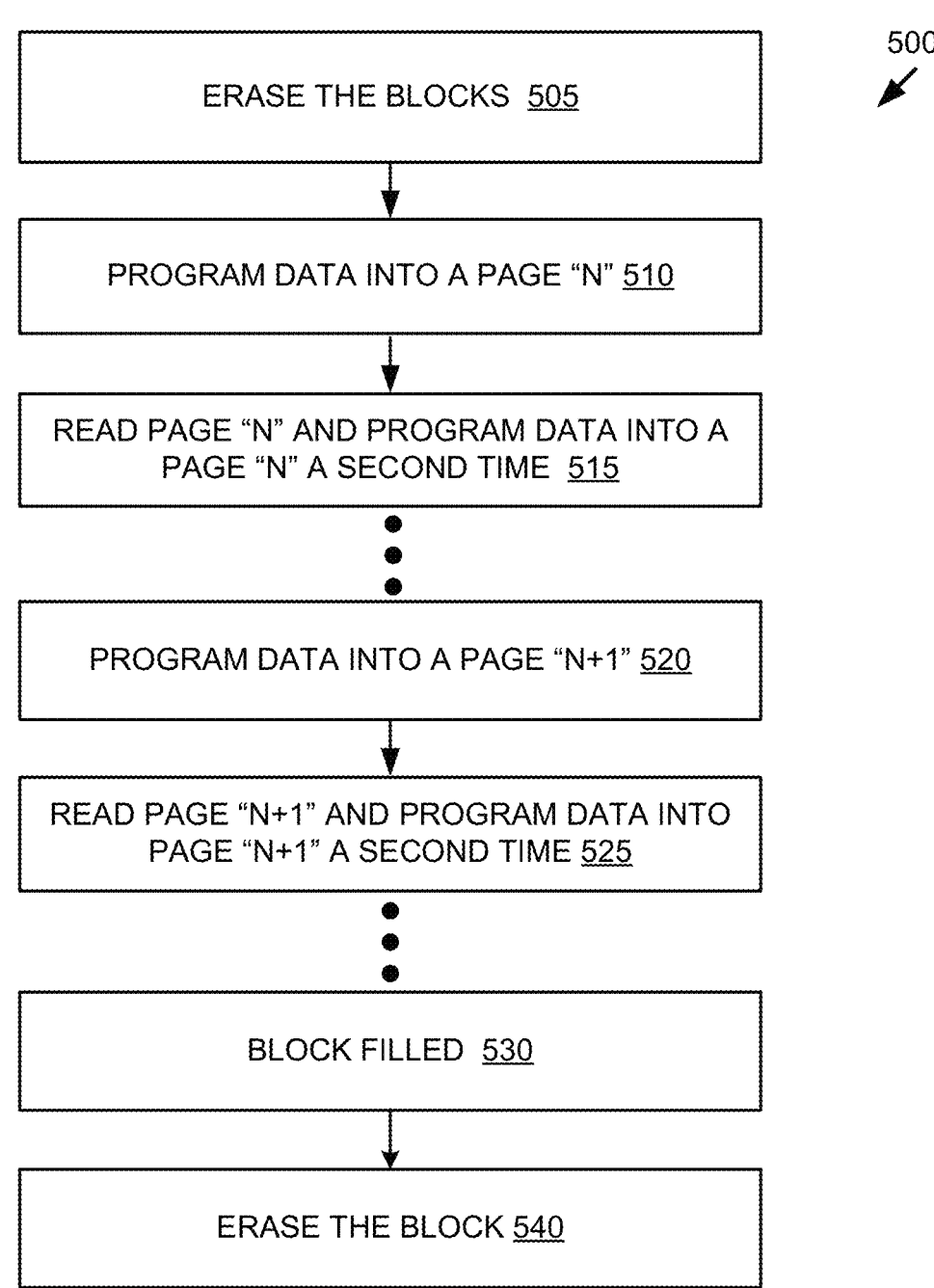
FIG. 5 is a flow diagram of an example method for multiple write programming, in accordance with some embodiments of the present disclosure.

FIG. 5 is a flow diagram of an example method of multiple write programming for a block, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by a local media controller 135 or program component 113 as described with reference to FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In at least one embodiment, method 500 is an alternative sequence of programming a block one or more times.

At operation 505, blocks are erased. For example, the processing logic (e.g., the local media controller 135 or the program component 113) can erase all blocks in a memory device (e.g., memory device 130 as described with reference to FIG. 2). In some embodiments, the processing logic proceeds to erase all pages in a respective block during the erase operation.

At operation 510, a page "N" is programmed. For example, the processing logic can program data into a page "N"—e.g., program data into a first page of the block.

At operation 515, the page "N" is read and programmed for a second time. For example, the processing logic can read the data previously programmed to page "N" and program data into a page "N" a second time e.g., program data into the first page of the block a second time. As described with reference to FIGS. 3 and 7, the processing logic can write to a page a second time to increase a logic state of one or memory cells to reflect the updated data— e.g., the processing logic can refrain from programming a memory cells to a decreasing logic state. For example, the processing logic can write a page a second time to program a memory cell from a logic state '0' to a logic state '1' but not vice versa (if the logic state '1' is the erase state, the processing logic can write a page to a second time to program a memory cell from a logic state '1' to a logic state '0' but not vice versa). In at least one embodiment, the processing logic can continue to program the page "N" an "X" number of times, where "X" is any number greater than two (2). In at least one embodiment, the processing logic can record or track a number of write operations performed on a respective page. In at least on embodiment, the processing logic can continue to program the page "N" as needed—e.g., based on receiving requests to update data stored at page "N." In some embodiments, the processing logic can proceed to programming a next page if no additional updates or programming operations are requested at page "N."

At operation 520, a page "N+1" is programmed. For example, the processing logic can program data into a page "N+1." e.g., program data into a second page of the block. In some examples, the "N+1" page can be adjacent to page "N"—e.g., the processing logic can program the next sequential page.

At operation 525, the page "N+1" is read and programmed a second time. For example, the processing logic can read the data previously programmed to page "N+1" and program data into a page "N+1" a second time—e.g., program data into a second page of the block a second time. In some embodiments, the processing logic can continue to program the page "N+1" until additional requests to program or update the data at the page "N+1" stop. In at least one embodiment, the processing logic can proceed to program page "N+2" a first time after programming the page "N+1" a "Y" number of times, where "Y" is a number greater than two (2). In some embodiments, "Y" is the same as "X." In other embodiments, "Y" is the greater than or less than "X"—e.g., the processing logic can program each page a different number of times based on a number of program requests or updates received for a respective page. In some embodiments, the processing logic can then program "N+2" a second time, a third time, etc. In at least one embodiment, the processing logic can continue to program the block in this manner—e.g., then program page "N+3" a first time, a second time, a third time, etc., proceed to program page "N+4" a first time, a second time, a third time, etc., and so forth.

At operation 530, a block is filled. For example, the processing logic can write data to each page of the block by a time 530. In some embodiments, after writing data to the block, an erase command is received, and the processing logic can proceed to operation 540.

At operation 540, the block is erased. For example, the processing logic can erase one or more blocks in a memory device. In some embodiments, the processing logic proceeds to erase all pages in a respective block during the erase operation.

Figure 6:
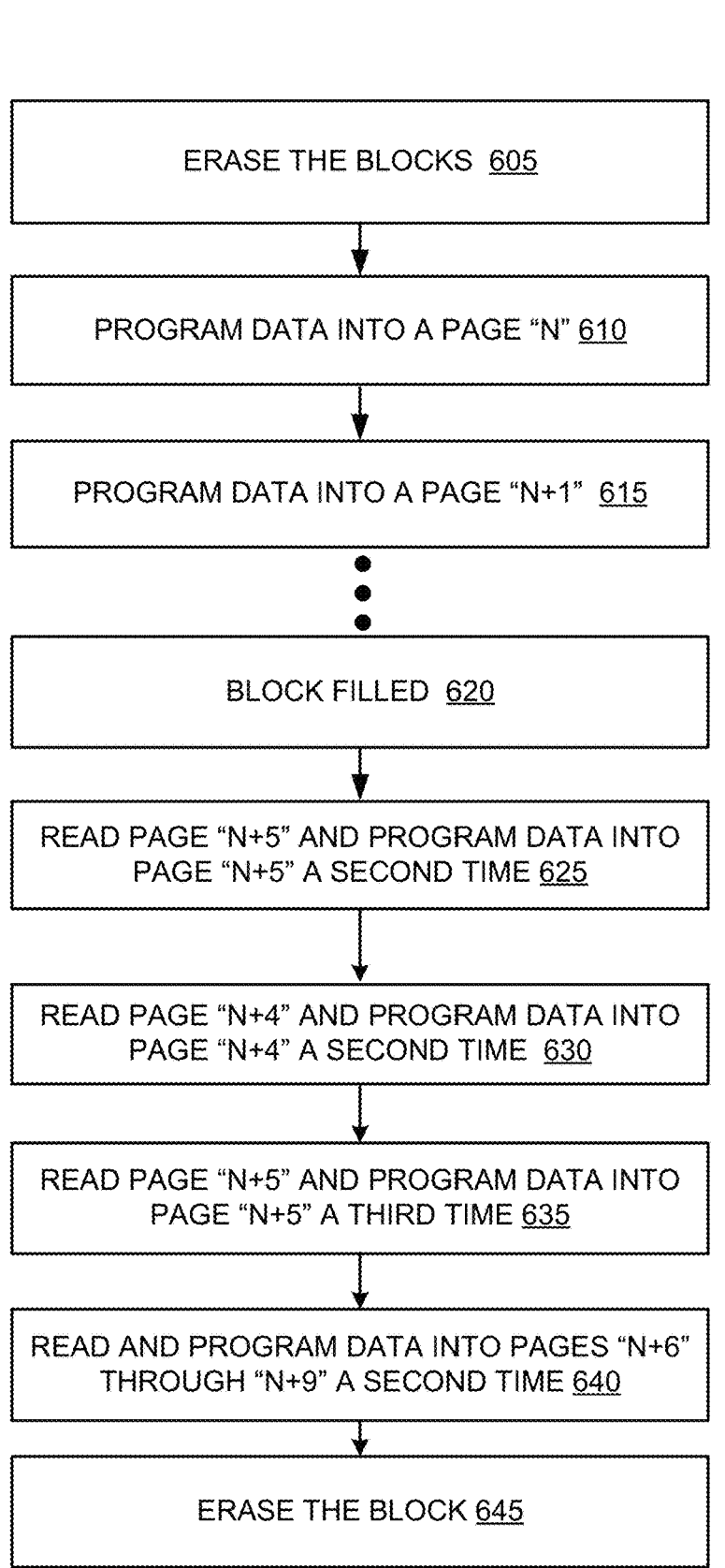
FIG. 6 is a flow diagram of an example method for multiple write programming, in accordance with some embodiments of the present disclosure.

FIG. 6 is a flow diagram of an example method of multiple write programming for a block, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by a local media controller 135 or program component 113 as described with reference to FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In at least one embodiment, method 600 is an alternative sequence of programming a block one or more times.

At operation 605, blocks are erased. For example, the processing logic (e.g., the local media controller 135 or the program component 113) can erase all blocks in a memory device (e.g., memory device 130 as described with reference to FIG. 2). In some embodiments, the processing logic proceeds to erase all pages in a respective block during the erase operation.

At operation 610, a page "N" is programmed. For example, the processing logic can program data into a page "N"—e.g., program data into a first page of the block.

At operation 615, a page "N+1" is programmed. For example, the processing logic can program data into a page "N+1."—e.g., program data into a second page of the block. In some examples, the "N+1" page can be adjacent to page "N"—e.g., the processing logic can program the go in a sequential order initially. In some embodiments, the processing logic can continue to program the pages sequentially—e.g., proceed to program page "N+2," then program page "N+3," program page "N+4," etc. until all pages in the block are programmed.

At operation 620, a block is filled. For example, the processing logic can write data to each page of the block by a time 620. In some embodiments, after writing data to the block, the processing logic can receive a command to write data a second time to one or more pages. For example, a host system (e.g., host system 120 as described with reference to FIG. 1) can request to update data at a particular block or page. In such examples, the processing logic can receive the request and then proceed with writing the updated data to the same block—e.g., as described herein, each page or block can be written to at least two times if data stored at the respective page or block is updated.

At operation 625, the page "N+5" is read and programmed for a second time. For example, the processing logic can read the data previously programmed to page "N+5" and program data into a page "N+5" a second time—e.g., program data into the sixth page of the block a second time. As described with reference to FIGS. 3 and 7, the processing logic can write to a page a second time to increase a logic state of one or memory cells to reflect the updated data—e.g., the processing logic can refrain from programming a memory cells to a decreasing logic state. For example, the processing logic can write a page a second time to program a memory cell from a logic state '0' to a logic state '1' but not vice versa (if the logic state '1' is the erase state, the processing logic can write a page to a second time to program a memory cell from a logic state '1' to a logic state '0' but not vice versa).

At operation 630, the page "N+4" is read and programmed a second time. For example, the processing logic can read the data previously programmed to page "N+4" and program data into a page "N+4" a second time—e.g., program data into a second page of the block a second time.

At operation 635, the page "N+5" is read programmed a third time. For example, the processing logic can read the data previously programmed to page "N+5" and program data into a page "N+5" a third time—e.g., program data into a sixth page of the block a third time. That is, the processing logic can proceed to program pages in a block at any time and any number of times based on receiving a request to program data or update data at a respective page—e.g., the processing logic can randomly program pages within block as requests are received.

At operation 640, the pages "N+6" through "N+9" are read programmed a second time. For example, the processing logic can read the data previously programmed to pages "N+6" through "N+9" and program data into pages "N+6" through "N+9" a second time—That is, the processing logic is also configured to program any number of pages within the block at a same time or program updated data to a set of pages within the block. Accordingly, by utilizing the methods described herein, the processing logic can write data to a page any number of times, at any time, in any order, along with any number of other pages in the block. In some embodiments, the processing logic can receive an erase command is received, and the processing logic can proceed to operation 645—e.g., the processing logic can receive an erase command even if the entire block is not filled or some pages have been written to more number of times than other pages.

At operation 645, the block is erased. For example, the processing logic can erase one or more blocks in a memory device. In some embodiments, the processing logic proceeds to erase all pages in a respective block during the erase operation.

Figure 7:
FIG. 7 is a diagram illustrating multiple write programming for a block, in accordance with some embodiments of the present disclosure.

FIG. 7 is a diagram illustrating multiple write programming for a block, according to at least one embodiment. In at least one embodiment, FIG. 7 illustrates a potential code (e.g., a write-once memory). In such examples, the WOM code is a coding scheme which enables multiple writes to a same memory cell without decreasing the logic state of the respective memory cell. In at least one embodiment, FIG. 7 illustrates a simple WOM code (e.g., a Rivest/Shamir) WOM code for the sake of clarity only. The example is not limiting on the claims and any WOM code or other write code can be implemented to write to memory cells two or more times without increasing the state of the memory cell.

In one embodiment, the WOM code illustrated in FIG. 7 uses three cells to write a two-bit message from a host system (e.g., host system 120). In such examples, each two-bit message can be written twice—e.g., a memory cell can be written to twice without decreasing the logic state of the memory cell. In some embodiments, there can be any number of bits cells used corresponding to any number of bits in a request or message received from the host system. By using the WOM code, the total terabytes written (TWB) can be increased as described above. In at least one embodiment, for diagram 700, a logic state '1' is considered an erase state (i.e., lower voltage) and a logic state '0' is considered a programmed state (i.e., higher voltage). Thus going from '1' to '0' is increasing the logic state. In other implementations, this can be reversed, however.

In diagram 700, the host system utilizing a two-bit message can result in four (4) possible logic states—e.g., a logic state '00', a logic state '01,' a logic state '10,' and a logic state '11.' In at least one embodiment, host data 705 having a logic state '00' can be programmed during a write 710-*a* as a '111.' In some embodiments, after receiving a request to write a '00,' processing logic (e.g., a local media controller 135 or a program component 113) can receive a second write request 710 to write a logic state '10'—e.g., the host system may update data from a '00' to a '10.' In such embodiments, the processing logic can program one or more memory cells again. For example, the processing logic can initially program a first cell and a third cell to result in a logic state '010' being programmed to the memory cells—e.g., the processing logic can increase 715 the state of two cells during a second write 710-*b* in order to update the data in place. That is, the processing logic can update the data by rewriting the same page. Similarly, the processing logic can initially program received host data 705 '11,' as a '110' during a write 710-*a*. In such examples, the processing logic may receive a request 720 to update the data to a '01'—e.g., the host data 705 can be updated. In some embodiments, the processing logic can perform a second write 710-*b* to increase 725 the state of a memory cell and program a '100' during the write 710-*b*. In other embodiments, the processing logic can receive the same host data 705 and refrain from changing the data during a second write 710-*b*. For example, the processing logic can receive a request 730 to write a '00' during a first write 710-*a* and then write a '00' during a second write 710-*b*. In such embodiments, the processing logic can program memory cells to '111' during the write 710-*a* and then program the memory cells to the same state '000' during the second write 710-*b* to increase 735 the state of the memory cell.

By implementing the WOM code or another code, the processing logic can rewrite data to a page (e.g., based on receiving updated data from a host system) without increasing a logic state of a respective memory cell. Accordingly, each page can be written to two or more times.

FIG. 8 is a flow diagram of an example method of multiple write programming for a block, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by a local media controller 135 or program component 113 as described with reference to FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, a first request to write first data to a page is received. For example, processing logic (e.g., local media controller 135 or program component 113) can receive a first request to write first data to a page of the one or more pages.

At operation 810, first data is programmed to the page of the one or more pages. For example, processing logic can program the first data to the page of the one or more pages at a first time responsive to receiving the first request.

At operation 815, a second request to write second data to a page is received. For example, processing logic can receive a second request to write second data to a page of the one or more pages.

At operation 820, the page of the one or more pages is read and second data is programmed to the page of the one or more pages. For example, processing logic can read the data previously programmed to the page of the one or more pages and program the second data to the page of the one or more pages at a second time responsive to receiving the second request. That is, as described with reference to FIGS. 3-7, the processing logic write to or program a page at least two or more times before an erase is performed. In at least one embodiment, the processing logic can use a WOM code or other code to write the page the second time as described with reference to FIG. 7. In such examples, the processing logic can increase the logic state of one or more memory cells of the page of one or more pages and refrain from decreasing the logic state of the memory cells of the page to program the second data to the page of the one or more pages at the second time.

At operation 825, an erase request is received. For example, processing logic can receive an erase request to erase the one or more pages after the second time. That is, the processing logic can receive the request to perform the erase operation after writing the page the second time. In at least one embodiment, the processing logic can erase the one or more pages responsive to receiving the erase request. In some embodiments, the processing logic can receive a third request to write third data to the page of the one or more pages and program the third data to the page of the one or more pages before receiving the erase command responsive to receiving the third request. That is, the processing logic can write to the same page any number of times greater than two as described with reference to FIGS. 3-7.

In some embodiments, the processing logic can also receive a third request to write third data to a second page of the one or more pages and program the third data to the second page of the one or more pages at a third time responsive to receiving the third request. The processing logic can further receive a fourth request to write fourth data to the second page of the one or more pages and program the fourth data to the second page of the one or more pages at a fourth time responsive to receiving the fourth request, wherein the fourth time is before receiving the erase command. That is, the processing logic can write any page two or more times in the block. For example, the second page can be physically adjacent to the page of the one or more pages—e.g., the processing logic can program the block sequentially as described with reference to FIG. 4. In other embodiments, the second page is nonadjacent to the page of the one or more pages—e.g., the processing logic can program the pages in any order as described with reference to FIG. 6. In some embodiments, the fourth time is before the second time—e.g., the processing logic can write to a page at any time. In at least one embodiment, the processing logic can receive a third request to write third data to a group of pages of the one or more pages, the group of pages excluding the page and program the third data to the group of pages of the one or more pages at a third time responsive to receiving the third request. In at least one embodiment, the processing logic can receive a fourth request to write fourth data to the group of pages of the one or more pages and program the fourth data to the group of pages of the one or more pages at a fourth time responsive to receiving the fourth request, wherein the fourth time is before receiving the erase command e.g., the processing logic can program any number of pages at a same time or group of pages at a same time as described with reference to FIG. 6.

Figure 9:
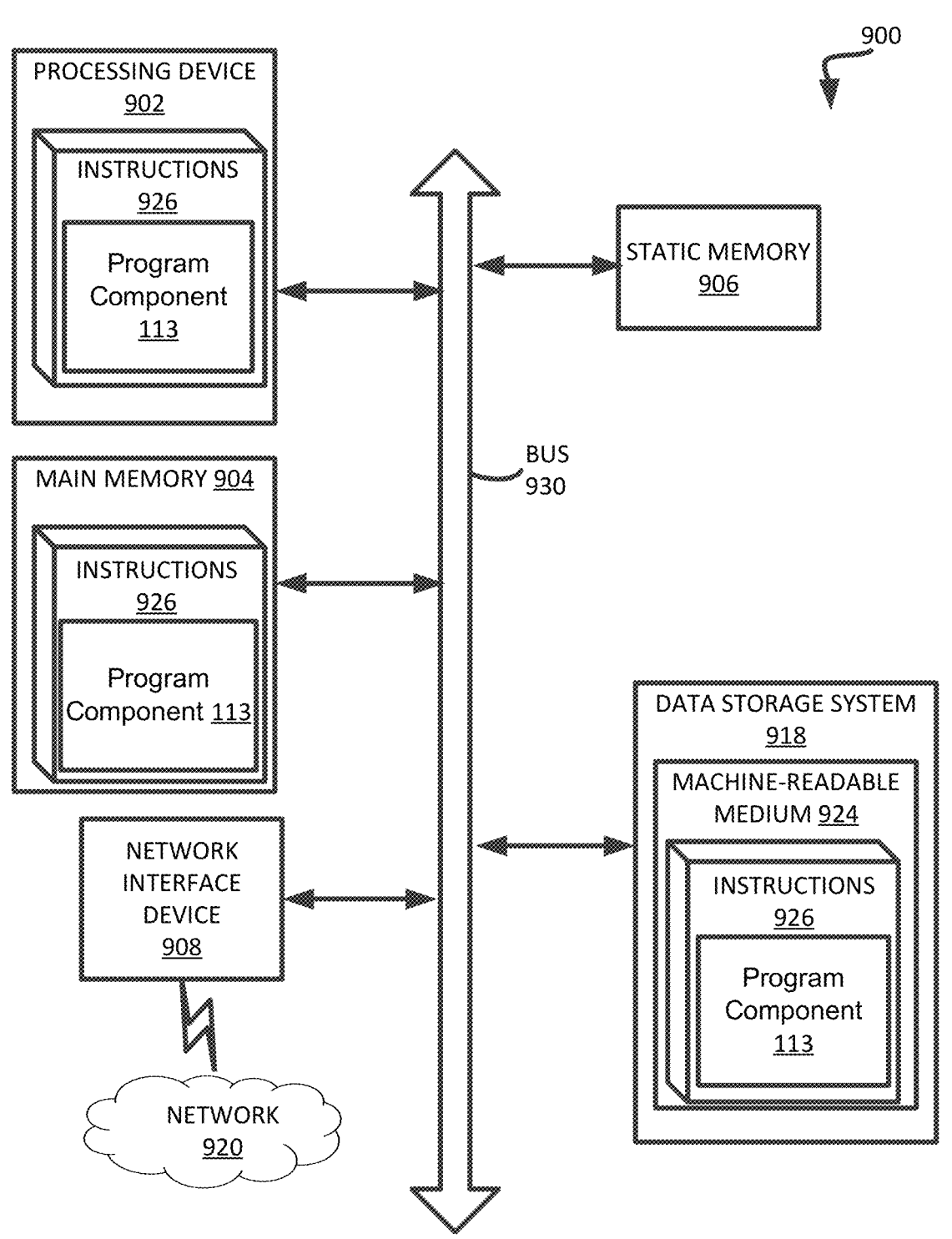
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to utilizing program component 113 of FIG. 1A to write to a page two or more times in a block). The program component 113 can program one or more pages of the memory device 130 two or more times. For example, the program component 113 can receive an initial request to program a page to store first data. The program component 113 can program the first data to the page. In some embodiments, the program component 113 can then receive a second request to write second data to the page—e.g., update the page with the second data. In such embodiments, the program component 113 can write to the same page a second time to program the page to the second data. In at least one embodiment, the program component 113 can update the page without decreasing a logical state of any memory cell within the page. Additional details regarding writing a page one or more times is described with reference to FIGS. 3-8 In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a voltage application component 113 to perform a read operation for the processing device 902. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array comprising memory cells arranged in one or more pages; and
control logic coupled to the memory array, the control logic to:
receive a first request to write first data to a page of the one or more pages;
program the first data to the page of the one or more pages at a first time responsive to receiving the first request;
receive a second request to write second data to the page of the one or more pages;
read the first data from the page of the one or more pages and program the second data to the page of the one or more pages based on the first data read from the page at a second time responsive to receiving the second request; and
receive an erase request to erase the one or more pages after the second time.

2. The memory device of claim 1, wherein the control logic is to:
erase the one or more pages responsive to receiving the erase request.

3. The memory device of claim 1, wherein the control logic is to:
receive a third request to write third data to the page of the one or more pages; and
read the page of the one or more pages and program the third data to the page of the one or more pages before receiving the erase command responsive to receiving the third request.

4. The memory device of claim 1, wherein the control logic is to:
receive a third request to write third data to a second page of the one or more pages;
program the third data to the second page of the one or more pages at a third time responsive to receiving the third request;
receive a fourth request to write fourth data to the second page of the one or more pages; and
read the second page of the one or more pages and program the fourth data to the second page of the one or more pages at a fourth time responsive to receiving the fourth request, wherein the fourth time is before receiving the erase command.

5. The memory device of claim 4, wherein the second page is physically adjacent to the page of the one or more pages.

6. The memory device of claim 4, wherein the second page is nonadjacent to the page of the one or more pages.

7. The memory device of claim 4, wherein the fourth time is before the second time.

8. The memory device of claim 1, wherein the control logic is to:

receive a third request to write third data to a group of pages of the one or more pages, the group of pages excluding the page;

program the third data to the group of pages of the one or more pages at a third time responsive to receiving the third request;

receive a fourth request to write fourth data to the group of pages of the one or more pages; and read the group of pages of the one or more pages and program the fourth data to the group of pages of the one or more pages at a fourth time responsive to receiving the fourth request, wherein the fourth time is before receiving the erase command.

9. The memory device of claim 1, wherein to program the second data to the page of the one or more pages at a second time, the control logic is to:

increase a logic state of one or more memory cells of the page of one or more pages; and refrain from decreasing the logic state of the memory cells of the page.

10. A method, comprising:

receiving a first request to write first data to a page of one or more pages of a memory array comprising memory cells;

programming the first data to the page of the one or more pages at a first time responsive to receiving the first request;

receiving a second request to write second data to the page of the one or more pages;

reading the first data from the page of the one or more pages and programming the second data to the page of the one or more pages based on the first data read from the page at a second time responsive to receiving the second request; and receiving an erase request to erase the one or more pages after the second time.

11. The method of claim 10, further comprising:

erasing the one or more pages responsive to receiving the erase request.

12. The method of claim 10, further comprising:

receiving a third request to write third data to the page of the one or more pages; and reading the page of the one or more pages and programming the third data to the page of the one or more pages before receiving the erase command responsive to receiving the third request.

13. The method of claim 10, further comprising:

receiving a third request to write third data to a second page of the one or more pages;

programming the third data to the second page of the one or more pages at a third time responsive to receiving the third request;

receiving a fourth request to write fourth data to the second page of the one or more pages; and reading the second page of the one or more pages and programming the fourth data to the second page of the one or more pages at a fourth time responsive to receiving the fourth request, wherein the fourth time is before receiving the erase command.

14. The method of claim 13, wherein the second page is physically adjacent to the page of the one or more pages.

15. The method of claim 13, wherein the second page is nonadjacent to the page of the one or more pages.

16. The method of claim 13, wherein the fourth time is before the second time.

17. The method of claim 10, further comprising:

receiving a third request to write third data to a group of pages of the one or more pages, the group of pages excluding the page;

programming the third data to the group of pages of the one or more pages at a third time responsive to receiving the third request;

receiving a fourth request to write fourth data to the group of pages of the one or more pages; and reading the group of pages of the one or more pages and programming the fourth data to the group of pages of the one or more pages at a fourth time responsive to receiving the fourth request, wherein the fourth time is before receiving the erase command.

18. The method of claim 10, further comprising:

increasing a logic state of one or more memory cells of the page of one or more pages while programming the second data to the page of the one or more pages at the second time; and refraining from decreasing the logic state of the memory cells of the page while programming the second data to the page of the one or more pages at the second time.

19. A non-transitory computer-readable medium storing instructions thereon, wherein the instructions, when executed by a processing device, cause the processing device to:

receive a first request to write first data to a page of one or more pages;

program the first data to the page of the one or more pages at a first time responsive to receiving the first request;

receive a second request to write second data to the page of the one or more pages;

read the first data from the page of the one or more pages and program the second data to the page of the one or more pages based on the first data read from the page at a second time responsive to receiving the second request; and receive an erase request to erase the one or more pages after the second time.

20. The non-transitory computer-readable medium of claim 19, wherein the processing device is further to:

erase the one or more pages responsive to receiving the erase request.

* * * * *